Aug. 22, 1944. S. G. TREPP 2,356,494
POLYMERIZATION OF CYCLOPENTADIENE TYPE COMPOUNDS
Filed Nov. 2, 1940 4 Sheets-Sheet 1

Inventor
Samuel G. Trepp.
by his Attorney
Hugo G. Kenman

Aug. 22, 1944.  S. G. TREPP  2,356,494
POLYMERIZATION OF CYCLOPENTADIENE TYPE COMPOUNDS
Filed Nov. 2, 1940  4 Sheets-Sheet 2
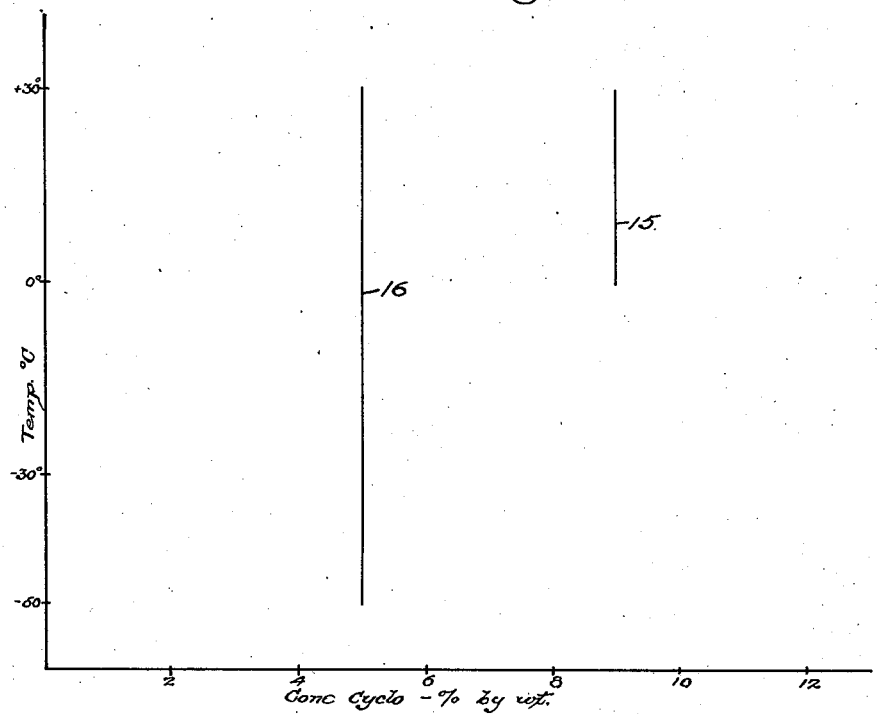
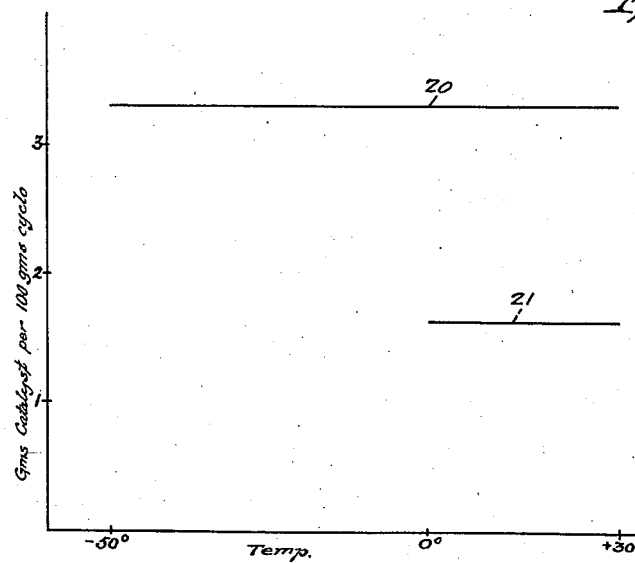
Inventor
Samuel G. Trepp
by his Attorney
Hugo G. Kemman Patented Aug. 22, 1944

2,356,494

UNITED STATES PATENT OFFICE 2,356,494

POLYMERIZATION OF CYCLOPENTADIENE TYPE COMPOUNDS

Samuel G. Trepp, Swarthmore, Pa., assignor to The United Gas Improvement Company, a corporation of Pennsylvania Application November 2, 1940, Serial No. 364,018

10 Claims. (Cl. 260—92.6)

This invention pertains generally to the catalytic polymerization of unsaturated compounds such as cyclopentadiene, and pertains particularly to the use of boron trifluoride gas as a catalyst.

The invention will be described in connection with the production of cyclopentadiene polymer of a specific type. However, it is to be understood that it may be employed in the production of polymers of other types.

Cyclopentadiene may be polymerized into at least two broad types of polymers one of which is characterized by being soluble in solvents such as benzene, toluene, chloroform, carbon tetrachloride and high flash naphtha, while the other is characterized by being insoluble in these solvents.

The polymerization is usually carried out while the cyclopentadiene is in solution in a solvent.

I have discovered that the soluble type of polymer may be produced with gaseous boron trifluoride by a careful control of the polymerizing reaction.

As disclosed in my copending application Serial Number 290,931, filed August 19, 1939, as a continuation-in-part of my application Serial Number 194,523, filed March 8, 1938, in the case of boron trifluoride-organic solvent complexes there are at least four factors which influence production of soluble polymer. These four factors are (1) temperature, (2) concentration of cyclopentadiene, (3) proportion of uniformly distributed catalyst, and (4) time.

In the case of highly concentrated boron trifluoride gas on the other hand, I have discovered that temperature has very little, if any, influence, and that the influence of time is relatively negligible. This is a surprising circumstance which does not apply to diluted boron trifluoride gas, the use of which is described and claimed in copending application Serial Number 185,695, filed January 19, 1938, by Newcomb K. Chaney, now Patent 2,220,211, November 5, 1940.

With respect to concentration of cyclopentadiene, generally speaking, and provided all other conditions remain the same, it appears that there is a threshold concentration of cyclopentadiene for the formation of insoluble polymer, and that at all concentrations below this threshold concentration the soluble form of polymer results to the substantially complete exclusion of insoluble polymer. The term "concentration of cyclopentadiene" as used herein and in the claims specifies the percentage by weight of cyclopentadiene, whether reacted or not, after all of the materials have been combined.

Furthermore, there appears to be a limiting concentration of cyclopentadiene beyond which some insoluble polymer will be formed regardless of the minimum quantity of said catalyst employed. When the cyclopentadiene is dissolved in toluene this limiting concentration is in the neighborhood of 10.5% cyclopentadiene, though when the concentration of cyclopentadiene is slightly above, say at 11%, only small quantities of the insoluble polymer are formed with minimum quantities of said catalyst.

As the concentration of cyclopentadiene is increased above 11% by weight the proportion of insoluble polymer increases rapidly until it is formed exclusively. Upon a further increase in concentration of cyclopentadiene, other conditions remaining the same, a point is rapidly reached at which insoluble protective films are formed about the boron tirfluoride bubbles to form small balls, resembling fish eggs, which float on the surface and leave the mass as a whole unpolymerized.

Also generally speaking, and provided all other conditions remain the same, it appears that there is a threshold proportion of boron trifluoride for the formation of insoluble polymer, and that with all proportions below this threshold the soluble polymer results. In this connection, experiments indicate quite clearly that catalyst is apparently used up during the polymerization of soluble polymer, and that additional catalyst is required to convert the soluble polymer into insoluble polymer. If the proportion of catalyst is such that there is no catalyst available for the formation of insoluble polymer, none will be formed.

On the other hand, threshold proportions of catalyst are not required to polymerize all of the cyclopentadiene into the soluble polymer, although it will be recognized that a minimum proportion will be required for maximum yields.

As pointed out above, there is a limiting concentration of cyclopentadiene above which at least some insoluble polymer will be formed even with minimum quantities of catalyst. However, for concentrations of cyclopentadiene below the limiting concentration a threshold proportion of catalyst can be shown to exist with any given concentration of cyclopentadiene.

While generally speaking, and provided all other conditions remain the same, there appears to be a threshold reaction time for the formation of insoluble polymer, it will be noted hereinafter in connection with the description of the drawings that the time curves are almost straight lines parallel to the time axis. It follows that for practicable purposes time may usually be ignored.

Thus, threshold reaction time differs from the other two factors in that the time necessary to form insoluble polymer approaches infinity at a very rapid rate.

When threshold conditions are just exceeded insoluble polymer is formed but not exclusively. This results in a mixture of soluble and insoluble polymers. When exceeding threshold conditions to a greater extent, however, insoluble polymer is formed exclusively. The band over which both soluble and insoluble polymers are formed varies in width with change in conditions. For instance, this band decreases in width with increase in temperature.

Furthermore, the exact values of (1) concentration of cyclopentadiene, (2) proportion of catalyst, and (3) reaction time at which insoluble polymer begins to appear may vary somewhat with change in solvent or possibly other conditions. However, the exact values may be readily determined by test.

The relationship between temperature, concentration of cyclopentadiene, proportion of catalyst, and reaction time is more particularly illustrated in the drawings in which:

Figure 2 is a graph on which temperature is plotted against concentration of cyclopentadiene for different proportions of catalyst, the reaction time being one hour;

Figure 3 is a graph on which proportion of catalyst is plotted against temperature for different concentrations of cyclopentadiene, the reaction time being one hour;

Figure 9:
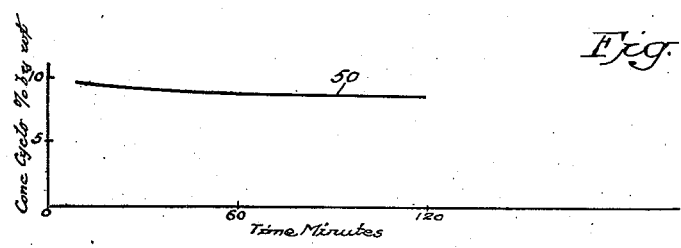
Figure 10:
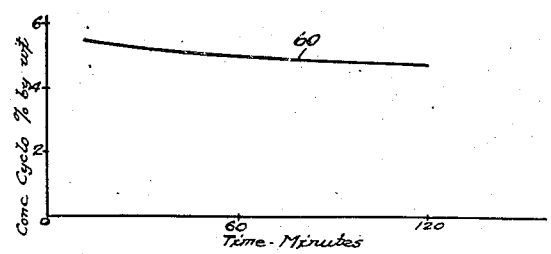

Figure 9 is a graph on which concentration of cyclopentadiene is plotted against time, the proportion of catalyst being 1.61 grams of catalyst per 100 grams of cyclopentadiene; and Figure 10 is a graph on which concentration of cyclopentadiene is plotted against time, the proportion of catalyst being 3.6 grams of catalyst per 100 grams of cyclopentadiene.

The arrangement of Figures 1 to 10 corresponds to the arrangement of Figures 1 to 10 in my above mentioned copending application, the same variables being plotted in the same manner in the corresponding figures.

Figure 1:
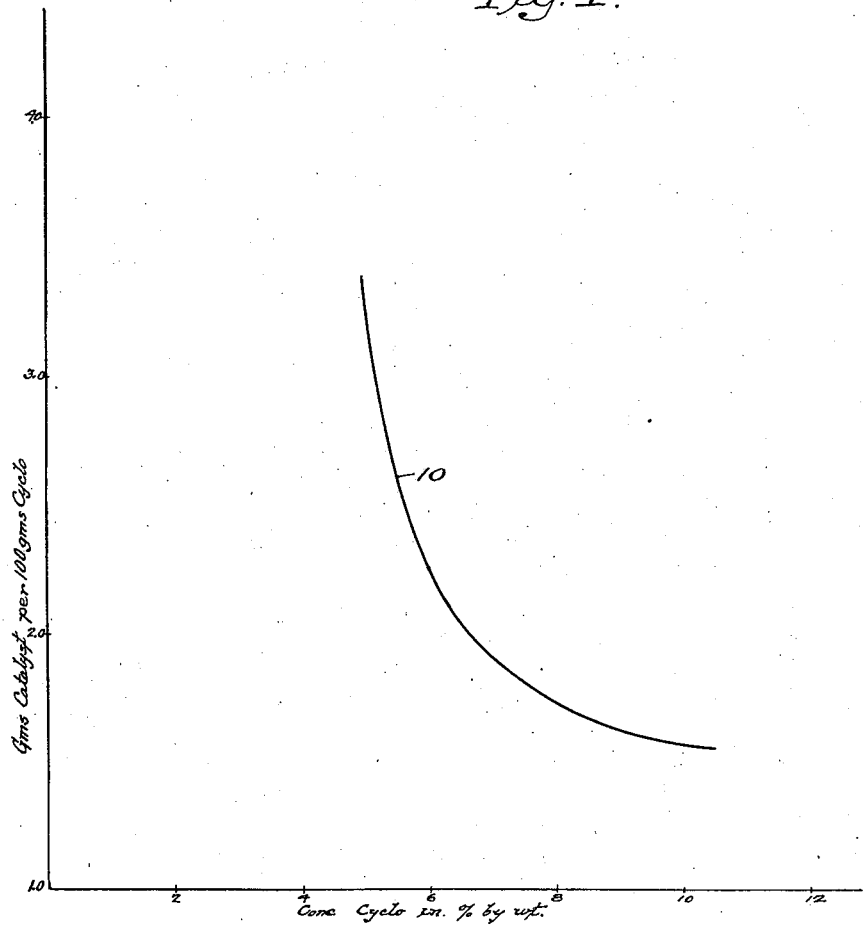
Figure 1 is a graph on which proportion of catalyst is plotted against concentration of cyclopentadiene, the reaction time being one hour.

Figures 1, 9, and 10 each represent data taken at temperatures of 30° C., 0° C., and −50° C. In all of the other figures, temperature is plotted on the graphs.

The solvent medium employed in obtaining the data for formulating the curves of Figures 1 to 10 was a commercial grade of toluene. The boron trifluoride gas was substantially 100% pure and had a density of 0.003 gram per cubic centimeter.

The refractive index of the cyclopentadiene employed was 1.4439.

The above data is given since a change in purity or source of cyclopentadiene or of catalyst or of solvent or a change in solvent might shift the curves of the graphs somewhat either horizontally or vertically or both, the curves, however, retaining substantially the same shape.

For instance, when substituting carbon tetrachloride for toluene the shift is vertical to the extent that only approximately 10% of the catalyst requirements with toluene are required when using carbon tetrachloride.

Referring now more particularly to Figure 1, curve 10 represents threshold conditions or, in other words, the boundary between conditions under which soluble polymer is formed exclusively or substantially so, and conditions under which at least a significant amount of insoluble polymer is formed.

The polymerizing reactions were permitted to proceed for one hour.

The polymerizing reactions in each case were stopped by the addition of water which hydrolyzed the catalyst, the products of hydrolysis being removed by the addition of alkali and filtering. The same procedure was used in obtaining the data for the graphs of the other figures.

The data represented by curve 10 was taken at 30° C., 0° C., and −50° C. This shows that there is no displacement of curve 10 with temperature, at least not within the range of from −50° C. to 30° C. In other words, as proportion of catalyst or concentration of cyclopentadiene, or both, increase or decrease, other conditions remaining the same, a change in temperature has no influence upon threshold conditions.

There is, of course, a wide area under curve 10 within which proportion of catalyst, or concentration of cyclopentadiene, or both, may be varied at will. In other words, the area to the left and below curve 10 represents conditions under which soluble polymer is formed exclusively or substantially so, and the area above and to the right of curve 10 represents conditions under which at least some insoluble polymer is formed, although when the concentration of cyclopentadiene is relatively high, it may be represented only by the insoluble films about the boron trifluoride gas particles.

There is a band or, in other words, a narrow bordering area (not shown) just above or to the right of curve 10 or both, in which the polymers formed are partly soluble and partly insoluble. Above and to the right of this band the polymer is wholly insoluble.

This band varies in width with change in conditions. For instance, this band decreases in width with increase in temperature.

What has been said with respect to the existence of a band just above or to the right of curve 10, or both, in which the polymers formed are partly soluble and partly insoluble, applies to all of the curves on all of the graphs. This description will not be repeated when referring more particularly to the graphs yet to be particularly described.

Referring now to Figure 2, curves 15 and 16 likewise represent threshold conditions.

The polymerizing reactions were stopped at the end of one hour.

It will be noted that the curves, which are in effect vertical lines, are displaced to the left with increase in the proportion of catalyst to cyclopentadiene.

In other words, as concentration of cyclopentadiene increases other conditions remaining the same except temperature which may vary more or less at will, as shown, the threshold proportion of catalyst decreases.

There is, of course, a wide area to the left of each curve within which the concentration of cyclopentadiene may be varied at will.

Curve 15 represents threshold conditions when the proportion of catalyst is 1.62 grams of catalyst per 100 grams of cyclopentadiene, and curve 16 represents threshold conditions when the proportion of catalyst is 3.3 grams of catalyst per 100 grams of cyclopentadiene.

Referring now to Figure 3, curves 20 and 21 likewise represent threshold conditions.

The reactions were stopped at the end of one hour.

It will be noted that the curves are displaced downwardly with increase in concentration of cyclopentadiene. In other words, as proportion of catalyst increases, other conditions remaining the same, except temperature which may be varied more or less at will, the threshold concentration of cyclopentadiene decreases.

There is, of course, a wide area under each curve within which proportion of catalyst may be varied at will.

Curve 20 represents threshold conditions when the concentration of cyclopentadiene is 5%, and curve 21 represents threshold conditions when the concentration of cyclopentadiene is 9%.

Figure 4:
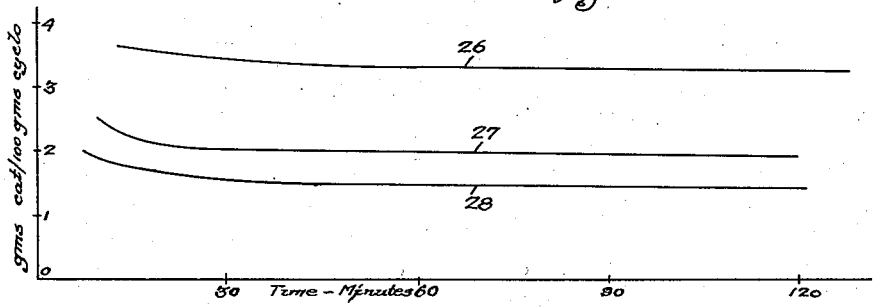
Figure 4 is a graph on which proportion of catalyst is plotted against time for different concentrations of cyclopentadiene, the temperature being 30° C.

Referring now to Figure 4, curves 26, 27 and 28 likewise represent threshold conditions.

The temperature of the reactions was held at substantially 30 C.

It will be noted that the curves are displaced to the left and downwardly with increase in cyclopentadiene concentration. In other words, as proportion of catalyst or time (the latter up to a certain point only) or both, increase, other conditions remaining the same, the threshold concentration of cyclopentadiene decreases.

There is, of course, a wide area under each curve within which proportion of catalyst, or time, or both may be varied at will.

Curve 26 shows threshold conditions when the concentrations of cyclopentadiene is 5%, curve 27 when the concentration of cyclopentadiene is 7%, and curve 28 when the concentration of cyclopentadiene is 9%.

Figure 5:
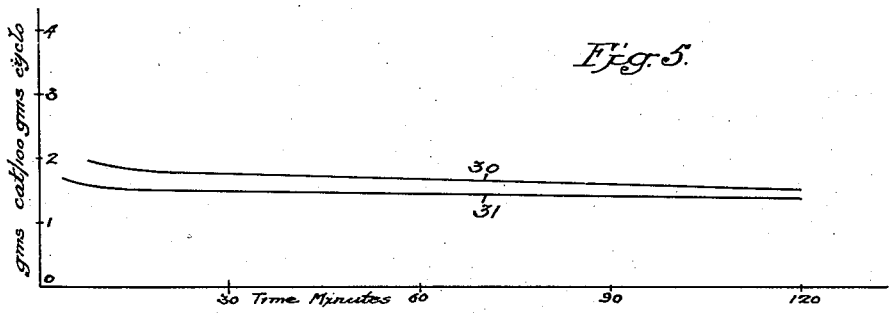
Figure 5 is a graph on which proportion of catalyst is plotted against time for different concentrations of cyclopentadiene, the temperature being 0° C.

Referring now to Figure 5, curves 30 and 31 likewise represent threshold conditions.

The temperature of the reactions was held at substantially 0° C.

It will be noted that the curves are displaced to the left and downwardly with increase in concentration of cyclopentadiene. In other words, and as previously stated in connection with Figure 4, as proportion of catalyst or time (the latter up to a certain point only), or both, increase other conditions remaining the same, the threshold concentration of cyclopentadiene decreases.

There is, of course, a wide area under each curve within which proportion of catalyst, or time, or both, may be varied at will.

Curve 30 shows threshold conditions when the concentration of cyclophentadiene is 9%, and curve 31 when the concentration of cyclopentadiene is 10.5%.

Figure 6:
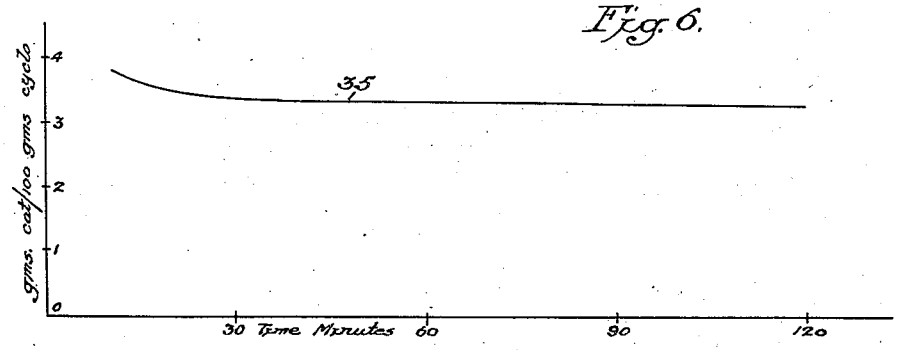
Figure 6 is a graph on which proportion of catalyst is plotted against time for a concentration of cyclopentadiene of 5%, the temperature being −50° C.

Referring now to Figure 6, curve 35 likewise represents threshold conditions.

The temperature of the reactions was held at substantially −50° C.

There is, of course, a wide area under curve 35 within which proportion of catalyst, or time, or both may be varied at will.

Curve 35 shows threshold conditions when the concentration of cyclopentadiene is 5%.

Figure 7:
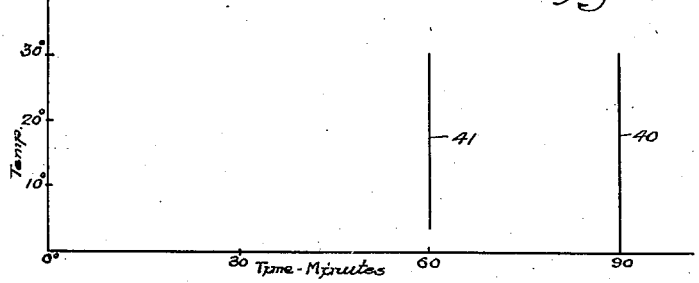
Figure 7 is a graph on which temperature is plotted against time for different concentrations of cyclopentadiene, the proportion of catalyst being 1.61 grams of catalyst per 100 grams of cyclopentadiene.

Referring now to Figure 7, curves 40 and 41 likewise represent threshold conditions.

The proportion of catalyst was held at 1.61 grams of catalyst per 100 grams of cyclopentadiene.

It will be noted that the curves are displaced to the left with increase in cyclopentadiene concentration. In other words, as time increases other conditions remaining the same, except temperature which may be varied more or less at will, the threshold concentration of cyclopentadiene decreases.

There is, of course, a wide area to the left of each curve within which time may be varied at will.

Curve 40 shows threshold conditions when the concentration of cyclopentadiene is 8.8%, and curve 41 when the concentration of cyclopentadiene is 9%.

Figure 8:
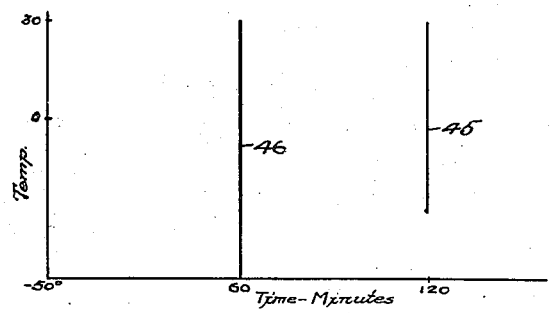
Figure 8 is a graph on which temperature is plotted against time for different concentrations of cyclopentadiene, the proportion of catalyst being 3.6 grams of catalyst per 100 grams of cyclopentadiene.

Referring now to Figure 8, curves 45 and 46 likewise represent threshold conditions.

The proportion of catalyst was held at 3.6 grams of catalyst per 100 grams of cyclopentadiene.

It will be noted that the curves are displaced to the left with increase in cyclopentadiene concentration. In other words, and as previously stated in connection with Figure 7, as time increases, other conditions remaining the same, except temperature which may be varied more or less at will, the threshold concentration of cyclopentadiene decreases.

There is, of course, a wide area to the left of each curve within which time may be varied at will.

Curve 45 shows threshold conditions when the concentration of cyclopentadiene is 4.8% and curve 46 when the concentration of cyclopentadiene is 5%.

Referring now to Figure 9, curve 50 likewise represents threshold conditions.

The proportion of catalyst was held at 1.61 grams of catalyst per 100 grams of cyclopentadiene.

The data represented by curve 50 was taken at 30° C., 0° C., and −50° C. This shows that there is no displacement of curve 50 with temperature, at least not within the range of −50° C. to 30° C. In other words, as concentration of cyclopentadiene, or time, or both increase or decrease, other conditions remaining the same, a change in temperature has very little or no influence upon threshold conditions.

There is, of course, a wide area under curve 50 within which concentration of cyclopentadiene, or time, or both, may be varied at will.

Referring now to Figure 10, curve 60 likewise represents threshold conditions.

The proportion of catalyst was held at 3.6 grams of catalyst per 100 grams of cyclopentadiene.

The data represented by curve 60 was taken at 30° C., 0° C., and −50° C. This shows that there is no displacement of curve 60 with temperature, at least not within the range of —50° C. to 30° C. In other words, and as previously stated in connection with Figure 9, as concentration of cyclopentadiene, or time, or both increase or decrease, other conditions remaining the same, a change in temperature has very little or no influence upon threshold conditions.

There is, of course, a wide area under curve 60 within which concentration of cyclopentadiene, or time, or both may be varied at will.

It will be noted that the curves of Figures 4, 5, 6, 9, and 10 rapidly approach horizontal after the expiration of 60 minutes. It is for this reason that reaction times of one hour were used in obtaining the data for Figures 1 to 3.

The type of soluble polymer obtained varied somewhat in characteristics with the solvent used during the polymerization.

Accordingly, in the preparation of my polymerized cyclopentadiene a solution of cyclopentadiene in a chosen solvent such as toluene is employed.

The reactants should not be combined too rapidly since under such circumstances the reaction may proceed too violently and cause local overheating with the production of undesirable color bodies which it is proposed to avoid.

The catalyst may be added to the solution of cyclopentadiene through a capillary inlet tube, in which case a small quantity of insoluble polymer may eventually accumulate in the tube itself sufficient to necessitate its replacement. Any other suitable means for adding the boron trifluoride gas may be employed.

The addition of one material to the other is preferably accompanied by thorough stirring which is preferably rapid to insure uniform distribution.

In addition, the reaction is preferably carried out in apparatus capable of temperature control such as a jacketed vessel provided with an agitator.

As an example, the proportion of catalyst may conveniently be not in excess of 5%, such as between .6% to 3.0% by weight of cyclopentadiene provided the concentration of cyclopentadiene is sufficiently low, thus avoiding the formation of insoluble polymer.

A proportion of catalyst of 1.0% by weight of the total cyclopentadiene present is found to be convenient. It permits variation in concentration of cyclopentadiene without the formation of insoluble polymer. Furthermore, there is less likelihood of discoloration of the final product than if a larger proportion of catalyst were used.

Incidentally, it appears that the molecular weight of the resulting soluble polycyclopentadiene may be varied somewhat by a choice of operating conditions.

For instance, gel-like polymers are obtained when operating just below threshold conditions. These polymers are completely soluble.

Incidentally, the formation of gel does not indicate definitely the presence of insoluble polymer.

Discoloration of the product appears to increase and decrease with increase and decrease in proportion of catalyst so that lower proportions of catalyst yield materials of lesser discoloration.

Temperatures above 100° C. are preferably avoided and it is recommended that great care be taken to keep the temperature throughout the reaction below this point.

Temperatures below the boiling point of cyclopentadiene are suitable. Such temperatures avoid the necessity of using pressure to maintain a liquid phase.

The reactants are preferably sufficiently agitated or other steps taken to avoid local overheating. The preferred temperature range is between —50° C. and 30° C.

The increase in color due to increased reaction temperature is quite noticeable at 45° C. and becomes very pronounced as the reaction temperature approaches 100° C.

On the other hand, at 0° C. and even though the proportion of catalyst is fairly high, surprisingly light colored polymers are obtained.

Low reaction temperatures are, therefore, indicated.

Cyclopentadiene solutions of any suitable concentration below say 10.5% by weight, can be used, keeping in mind what has been said with respect to threshold conditions, although I more often employ concentrations of cyclopentadiene of from 7 to 10% by weight of total reactants.

Incidentally, it appears that the molecular weight of the resulting soluble polycyclopentadiene may be varied somewhat by varying the concentration of cyclopentadiene in the starting material.

Under the recommended conditions the polymer is formed in good yield and with a satisfactory color.

The chosen time for the reaction may vary considerably keeping in mind what has been said about threshold conditions. I find that for practicable purposes and good yields other conditions should be chosen such that the reaction time is somewhere in the neighborhood of one hour or more. This is borne out by the fact that the yield increases with reaction time up to a certain point. The time is, of course, preferably chosen to obtain good yields.

The following specific examples will serve to further illustrate the invention:

*Example I*

268.5 grams toluene and 31.5 grams cyclopentadiene were placed in a flask fitted with an agitator and a thermometer. The flask was cooled to zero degrees and with agitation, 100 cc. (.3 gram) gaseous boron trifluoride were uniformly added during 10 minutes through a 5 mm. inlet tube. Agitation was continued for two hours. 10 cc. of a 10% sodium carbonate solution were then added and the flask agitated one hour at 80°. The temperature was then raised sufficiently to distill off a mixture of water and toluene so that the remaining solution contained 20% polycyclopentadiene and was substantially dry. This solution was freed of suspended solid matter by filtration with the aid of 3 grams of a filter aid known commercially as Celite.

*Example II*

273 grams toluene and 27 grams cyclopentadiene were placed in a flask fitted with an agitator and a thermometer. The flask was cooled to zero degrees and with agitation, 100 cc. (.3 gram) gaseous boron trifluoride were uniformly added during 10 minutes through a 5 mm. inlet tube. Agitation was continued for two hours. 10 cc. of a 10% sodium carbonate solution were then added and the flask agitated for one hour at 80°. The temperature was then raised sufficiently to distill off a mixture of water and toluene so that the remaining solution contained 20% polycyclopentadiene and was substantially dry. This solution was freed of suspended solid matter by filtration with the aid of 3 grams of a filter aid known commercially as Celite.

The addition of water or a water solution as above to hydrolyze the catalyst makes it possible not only to completely remove the activity of the catalyst and thus stop the reaction at any point, but also makes it possible to remove the corrosive and discoloring acid constituents of the catalyst by a suitable alkali. The alkali is preferably added with the water used to hydrolyze the catalyst, although it may be added later if desired. The failure to substantially completely remove the catalyst and its hydrolysis products may be the cause of serious discoloration. The insoluble reaction products formed during the hydrolysis and neutralization remain behind on the filter leaving a highly purified filtrate.

This polymer may be used as such, or it may be concentrated in a vacuum still of suitable design to give a product containing any desired higher concentration of polycyclopentadiene, including solid polycyclopentadiene, or it might be diluted to give any desired lower concentration, or a second solvent might be substituted such as a higher boiling solvent. This may be done either before or after concentration by adding the second solvent and distilling.

In the above examples, the particular temperatures were chosen to control the physical properties such as viscosity and color of the product. It will be noted that at no time did the temperature exceed 100° C. or even 30° C. The manner of combining the reactants, constant agitation, and brine cooling made it possible to prevent local overheating, and the formation of discolored polymer.

In the above examples (1) temperature, (2) concentration of cyclopentadiene, (3) proportion of catalyst, and (4) reaction time may be varied considerably in the production of soluble polymer having in mind what has been said with respect to threshold conditions. If it is found that insoluble polymer is obtained, one or more of the three conditions, namely (1) concentration of cyclopentadiene, (2) proportion of catalyst, and (3) reaction time should be reduced until the soluble polymer is obtained.

Carrying out the polymerization in the presence of a solvent makes it possible to have any desired concentration of cyclopentadiene.

While in the above example no further dilution of the product was required to facilitate hydrolysis and/or filtering, it is to be understood that dilution with a solvent may be employed, if desired, particularly in the case of highly viscous products.

Generally speaking, for the formation of soluble polymer to the exclusion of insoluble polymer and/or of extreme discoloration, temperatures should rarely exceed 100° C., and preferably should not exceed 30° C., concentrations of cyclopentadiene should rarely exceed 11% by weight of the total solution, and concentrations of catalyst should rarely exceed 10% by weight of cyclopentadiene.

It should be kept in mind that there are for practical purposes minimum values for concentration of cyclopentadiene and proportion of catalyst, which practice will show ought to be exceeded to obtain reasonable yields. On the other hand, if the maximum values given in the previous paragraph for catalyst and cyclopentadiene were used simultaneously, insoluble polymer might be formed, even though the reaction time chosen were as short as good practice would permit.

It is by the observance of the preferred principles set forth herein that a quality product is produced in good yield.

While in the above specific examples toluene is used as a polymerization medium, it is to be understood that any other solvent may be substituted of which benzene, xylene, ethyl benzene, solvent naphtha, petroleum naphtha, carbon tetrachloride, and ethylene dichloride are especially suitable. The products with benzene and toluene are preferred for specific uses as hereinafter referred to.

Any other suitable alkali such as sodium hydroxide, sodium carbonate, sodium bicarbonate, magnesium hydroxide, an amine or other basic substance might be substituted for $Na_2CO_3$ in the above specific examples, followed by a non-acidic drying agent such as $Na_2SO_4$, or soda lime. Both neutralization and drying is effected by CaO.

In case it is desired to form a highly concentrated solution of polycyclopentadiene, or to isolate it in solid form, it is not necessary to dry the solution after neutralization as the water present can be readily removed in the subsequent concentrating operation. The complete removal of insoluble material present, such as the neutralizing agent, is then effected by filtering the partially concentrated solution after the complete removal of the water present by distillation. After this step the solution can be further concentrated if desired.

The product may be used for many purposes, for instance, for lacquers generally, for varnishes either alone or in admixture with other resins, for enamels, for paints, or in fact for coating compositions generally. It is ideally suited to the coating of metals, for instance, for the coating of food containers as described and claimed in copending application, Serial Number 291,007, filed Aug. 19, 1939, by Newcomb K. Chaney. This is especially true of the products polymerized in benzene and toluene.

It is possible to obtain soluble polycyclopentadiene of higher viscosity or of otherwise changed characteristics by starting with a solution of polycyclopentadiene and stopping the reaction before threshold conditions are exceeded.

While the invention has been particularly described in connection with the homo-polymerization of cyclopentadiene, it is to be understood that it is applicable to the homo-polymerization of substituted cyclopentadienes having the cyclopentadiene nucleus containing the characteristic conjugated double bonds exclusively within the cyclopentadiene nucleus. However, it is to be understood that the polymer particularly described has certain unique characteristics which distinguish it from polymers prepared from other starting materials. Examples of such other compounds are the alkyl substituted cyclopentadienes. Methyl cyclopentadiene is a representative alkyl substituted cyclopentadiene. The invention is also applicable to the co-polymerization of two or more of the foregoing compounds, for instance, the co-polymerization of cyclopentadiene with methyl cyclopentadiene. All other unsaturates which are polymerizable under the conditions obtaining during my polymerization step are preferably excluded to avoid co-polymerization therewith.

While the invention has been more particularly described in connection with the introduction of the concentrated boron trifluoride gas into a solution of the material to be polymerized, it is to be understood that the solution and gas may be contacted in any other manner. For instance, the solution may be placed in a closed container provided with an agitator and the concentrated gas may be admitted into the space above the solution, for example, after washing out any air which might be present. In this case the solution absorbs the catalyst from above and due to the relatively low concentration of cyclopentadiene and agitation, a smooth continuous reaction is obtained without spontaneous evolution of large quantities of heat.

Other variations will suggest themselves to persons skilled in the art upon becoming familiar herewith.

By the term "homo-polymerization" or its equivalent as used in the claims is meant the additive combination of material having as its source the same monomer as distinguished from "co-polymerization" by which is meant the combination of material having as its source two or more different monomers.

The terms "benzene-soluble" and "benzene-insoluble" in the claims describe the characteristics of polymers referred to and do not in any way imply that the presence of benzene is necessary.

It is to be understood that the above specific examples are by way of illustration. Therefore, changes, omissions, additions, substitutions, and/or modifications might be made within the scope of the claims without departing from the spirit of the invention which is intended to be limited only as required by the prior art.

I claim:

1. In a process for catalytically polymerizing an unsaturated compound selected from the group consisting of cyclopentadiene and alkyl substituted cyclopentadienes having the cyclopentadiene nucleus containing the characteristic conjugated double bonds in the substantial absence of compounds of other types polymerizable under the conditions obtaining wherein substantially undiluted gaseous boron trifluoride is employed as catalyst, the steps of preventing the total formation of benzene-insoluble polymers comprising thoroughly agitating the reaction mass while maintaining the reaction temperature not in excess of 100° C., maintaining the concentration of said unsaturated compound not in excess of 11% by weight, maintaining the proportion of catalyst to said unsaturated compound not in excess of 10% by weight, and stopping the reaction while benzene-soluble polymer is present in the reaction mass.

2. In a process for catalytically polymerizing an unsaturated compound selected from the group consisting of cyclopentadiene and alkyl substituted cyclopentadienes having the cyclopentadiene nucleus containing the characteristic conjugated double bonds in the substantial absence of compounds of other types polymerizable under the conditions obtaining wherein substantially undiluted gaseous boron trifluoride is employed as catalyst, the steps of preventing the total formation of benzene-insoluble polymers comprising thoroughly agitating the reaction mass while maintaining the reaction temperature not in excess of 45° C., maintaining the concentration of said unsaturated compound not in excess of 11% by weight, maintaining the proportion of catalyst to said unsaturated compound not in excess of 10% by weight, and stopping the reaction while benzene-soluble polymer is present in the reaction mass.

3. In a process for catalytically polymerizing cyclopentadiene in the substantial absence of compounds of other types polymerizable under the conditions obtaining wherein substantially undiluted gaseous boron trifluoride is employed as catalyst, the steps of preventing the total formation of benzene-insoluble polymer comprising thoroughly agitating the reaction mass while maintaining the reaction temperature not in excess of 30° C., maintaining the concentration of cyclopentadiene not in excess of 11% by weight, maintaining the proportion of catalyst to cyclopentadiene not in excess of 10% by weight, and stopping the reaction while benzene-soluble polycyclopentadiene is present in the reaction mass.

4. In a process for catalytically polymerizing methyl cyclopentadiene in the substantial absence of compounds of other types polymerizable under the conditions obtaining wherein substantially undiluted gaseous boron trifluoride is employed as catalyst, the steps of preventing the total formation of benzene-insoluble polymer comprising thoroughly agitating the reaction mass while maintaining the reaction temperature not in excess of 30° C., maintaining the concentration of methyl cyclopentadiene not in excess of 11% by weight, maintaining the proportion of catalyst to methyl cyclopentadiene not in excess of 10% by weight, and stopping the reaction while benzene soluble polymer is present in the reaction mass.

5. A process for the homo-polymerization of cyclopentadiene, comprising adding substantially undiluted gaseous boron trifluoride to a solution of cyclopentadiene with thorough agitation while maintaining the reaction temperature below 30° C., the concentration of cyclopentadiene below 11% by weight, the proportion of catalyst to cyclopentadiene below 3% by weight, and stopping the reaction before any appreciable quantity of benzene-insoluble polymer is formed in the reaction mass.

6. A process for the homo-polymerization of methyl cyclopentadiene, comprising adding substantially undiluted gaseous boron trifluoride to a solution of methyl cyclopentadiene with thorough agitation while maintaining the reaction temperature below 30° C., the concentration of methyl cyclopentadiene below 11% by weight, the proportion of catalyst to methyl cyclopentadiene below 3% by weight, and stopping the reaction before any appreciable quantity of benzene-insoluble polymer is formed in the reaction mass.

7. A process for catalytically polymerizing an unsaturated compound selected from the group consisting of cyclopentadiene and alkyl substituted cyclopentadienes having the cyclopentadiene nucleus containing the characteristic double bonds in the substantial absence of compounds of other types polymerizable under the conditions obtaining, comprising adding substantially undiluted boron trifluoride to a solution of said unsaturated compound not in excess of 11% by weight, and further preventing the total formation of benzene-insoluble polymer by maintaining the reaction temperature not in excess of 30° C., maintaining the proportion of catalyst to said unsaturated compound not in excess of 5% by weight and stopping the reaction while benzene-soluble polymer is present in the reaction mass.

8. A process for catalytically polymerizing cyclopentadiene in the substantial absence of compounds of other types polymerizable under the conditions obtaining, comprising adding substantially undiluted gaseous boron trifluoride to a solution of cyclopentadiene not in excess of 11% by weight, and further preventing the total formation of benzene-insoluble polymer by maintaining the reaction temperature not in excess of 30° C., maintaining the proportion of catalyst to cyclopentadiene not in excess of 5% by weight, and stopping the reaction while benzene-soluble polymer is present in the reaction mass.

9. A process for catalytically polymerizing methyl cyclopentadiene in the substantial absence of compounds of other types polymerizable under the conditions obtaining, comprising adding substantially undiluted gaseous boron trifluoride to a solution of methyl cyclopentadiene not in excess of 11% by weight, and further preventing the total formation of benzene-insoluble polymer by maintaining the reaction temperature not in excess of 30° C., maintaining the proportion of catalyst to methyl cyclopentadiene not in excess of 5% by weight, and stopping the reaction while benzene-soluble polymer is present in the reaction mass.

10. A process for catalytically polymerizing an unsaturated hydrocarbon selected from the group consisting of cyclopentadiene and alkyl substituted cyclopentadienes having the cyclopentadiene nucleus containing the characteristic conjugated double bonds in the substantial absence of compounds of other types polymerizable under the conditions obtaining, comprising adding substantially undiluted boron trifluoride to a solution of said unsaturated hydrocarbon not in excess of 11% by weight, and further preventing the formation of benzene-insoluble polymer by maintaining the reaction temperature not in excess of 45° C., maintaining the proportion of catalyst to said unsaturated hydrocarbon not in excess of 5% by weight, and stopping the reaction while benzene-soluble polymer is present in the reaction mass.

SAMUEL G. TREPP.